United States Patent
Kim et al.

(10) Patent No.: US 11,002,984 B2
(45) Date of Patent: May 11, 2021

(54) STEREOSCOPIC DISPLAY APPARATUS

(71) Applicant: LG Display Co., Ltd., Seoul (KR)

(72) Inventors: Dong-Yeon Kim, Seoul (KR); Wook Jeon, Daejeon (KR); Hee-Jin Im, Paju-si (KR); Yong-Ku Lee, Gimpo-si (KR); Ju-Hoon Jang, Paju-si (KR); You-Yong Jin, Seoul (KR); Woon-Chan Moon, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/714,190

(22) Filed: Dec. 13, 2019

(65) Prior Publication Data
US 2020/0209647 A1    Jul. 2, 2020

(30) Foreign Application Priority Data
Dec. 31, 2018    (KR) .................. 10-2018-0173708

(51) Int. Cl.
| | | |
|---|---|---|
| *G02F 1/1335* | (2006.01) | |
| *G02F 1/1343* | (2006.01) | |
| *G02B 30/22* | (2020.01) | |
| *G02F 1/1333* | (2006.01) | |
| *G02F 1/13363* | (2006.01) | |
| *G02F 1/1345* | (2006.01) | |

(52) U.S. Cl.
CPC ......... *G02B 30/22* (2020.01); *G02F 1/13363* (2013.01); *G02F 1/13452* (2013.01); *G02F 1/133345* (2013.01); *G02F 1/133512* (2013.01); *G02F 1/133528* (2013.01); *G02F 1/134336* (2013.01); *G02F 2001/133638* (2013.01); *G02F 2201/121* (2013.01); *G02F 2413/01* (2013.01); *G02F 2413/05* (2013.01)

(58) Field of Classification Search
CPC ...... H04N 13/31; H04N 13/398; G02B 30/26; G02B 30/31; G02B 30/22; G02F 1/1335; G02F 1/133528; G02F 1/133512; G02F 1/1336; G02F 1/133615; G02F 1/13363; G02F 1/1343; G02F 1/134336; G02F 1/13452; G02F 1/1333; G02F 1/1345; G02F 1/133345; G02F 1/1362; G02F 1/136227; G02F 1/1368; G02F 2001/133638; G02F 2201/121; G02F 2413/01; G02F 2413/05; H01L 51/50
See application file for complete search history.

(56) References Cited

U.S. PATENT DOCUMENTS

| | | | |
|---|---|---|---|
| 10,057,541 B2 * | 8/2018 | Chung | H04N 5/232 |
| 2006/0215262 A1 * | 9/2006 | Kim | G02B 30/27 |
| | | | 359/465 |
| 2011/0043713 A1 * | 2/2011 | Nam | G02F 1/13363 |
| | | | 349/15 |
| 2013/0053100 A1 * | 2/2013 | Song | G09G 3/003 |
| | | | 455/556.1 |

(Continued)

*Primary Examiner* — Thoi V Duong
(74) *Attorney, Agent, or Firm* — Fenwick & West LLP

(57) ABSTRACT

A stereoscopic display apparatus is disclosed. In the stereoscopic display apparatus, each unit pixel of a display panel includes a first transparent region. A barrier panel on the display panel may include second transparent regions overlapping with the first transparent region of each unit pixel. Thus, in the stereoscopic display apparatus, the transparency may be improved without the quality deterioration of a stereoscopic image.

15 Claims, 8 Drawing Sheets

(56) References Cited

U.S. PATENT DOCUMENTS

2013/0107146 A1* 5/2013 Kim .................. G02F 1/1347
349/15
2013/0208195 A1* 8/2013 Cho .................. H04N 13/315
349/15

* cited by examiner

STEREOSCOPIC DISPLAY APPARATUS

CROSS-REFERENCE TO RELATED APPLICATIONS

This application claims the priority benefit of Republic of Korea Patent Application No. 10-2018-0173708, filed on Dec. 31, 2018, which is hereby incorporated by reference in its entirety.

BACKGROUND

Field of Technology

The present disclosure relates to a stereoscopic display apparatus in which each unit pixel of a display panel includes a transparent region.

Discussion of the Related Art

Generally, a display apparatus includes a display panel realizing an image. For example, the display apparatus may include a liquid crystal panel having a liquid crystal and/or an OLED panel having a light-emitting device.

The display apparatus may separate the image realized by the display panel using a barrier panel. For example, a stereoscopic display apparatus providing a stereoscopic image to a user may provide different images to the right eye and the left eye of the user by the barrier panel which is disposed on the display panel.

The barrier panel may include transmitting regions and blocking regions for separation of the image. The transmitting regions and the blocking regions may be formed by a voltage applied to channel electrodes which are disposed in parallel. For example, the barrier panel may include the channel electrodes across an active area through which light emitted from the display panel passes.

However, when each unit pixel of the display panel includes a transparent region, the transparency of the stereoscopic display apparatus may be deteriorated by the blocking regions of the barrier panel which are formed on the transparent regions of the display panel.

SUMMARY

Accordingly, the present disclosure is directed to a stereoscopic display apparatus that substantially obviates one or more problems due to limitations and disadvantages of the related art.

An object of the present disclosure is to provide a stereoscopic display apparatus capable of reducing the quality deterioration of the stereoscopic image provided to the user, and increasing the transparency.

Another object of the present disclosure is to provide a stereoscopic display apparatus capable of reducing the luminance reduction of the transparent region due to the barrier panel Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stereoscopic display apparatus including a display panel. The display panel includes unit pixels. Each unit pixel of the display panel includes an image displaying region and a first transparent region. A barrier panel is disposed on the display panel. The barrier panel includes barrier regions overlapping with the image displaying region of each unit pixel, and second transparent regions overlapping with the first transparent region of each unit pixel.

Each of the second transparent regions has the same size as the first transparent region of each unit pixel. Each of the barrier regions has the same size as the image displaying region of each unit pixel.

The barrier panel includes channel electrodes, a lower insulating layer, lower common electrodes, a barrier liquid crystal layer and an upper common electrode layer, which are sequentially stacked between a lower barrier substrate and an upper barrier substrate. The lower common electrodes overlap with the second transparent regions.

The upper common electrode layer overlaps with the barrier regions and the second transparent regions.

The image displaying region and the first transparent region of each unit pixel are disposed side by side in a first direction. Each of the channel electrodes crosses the barrier regions and the second transparent regions, which are disposed side by side in the first direction.

Each of the lower common electrodes extends in a second direction perpendicular to the first direction. The second transparent regions overlap with intersections of the lower common electrodes and the channel electrodes.

A horizontal distance of each lower common electrode in the first direction is the same as a horizontal distance of each second transparent region in the first direction.

The barrier panel further includes a common voltage supply line extending along an edge of the lower barrier substrate. Each of the lower common electrodes is connected to the common voltage supply line in the outside of an active area in which the barrier regions and the second transparent regions are disposed.

The display panel includes light-emitting structures in the image displaying region of each unit pixel.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
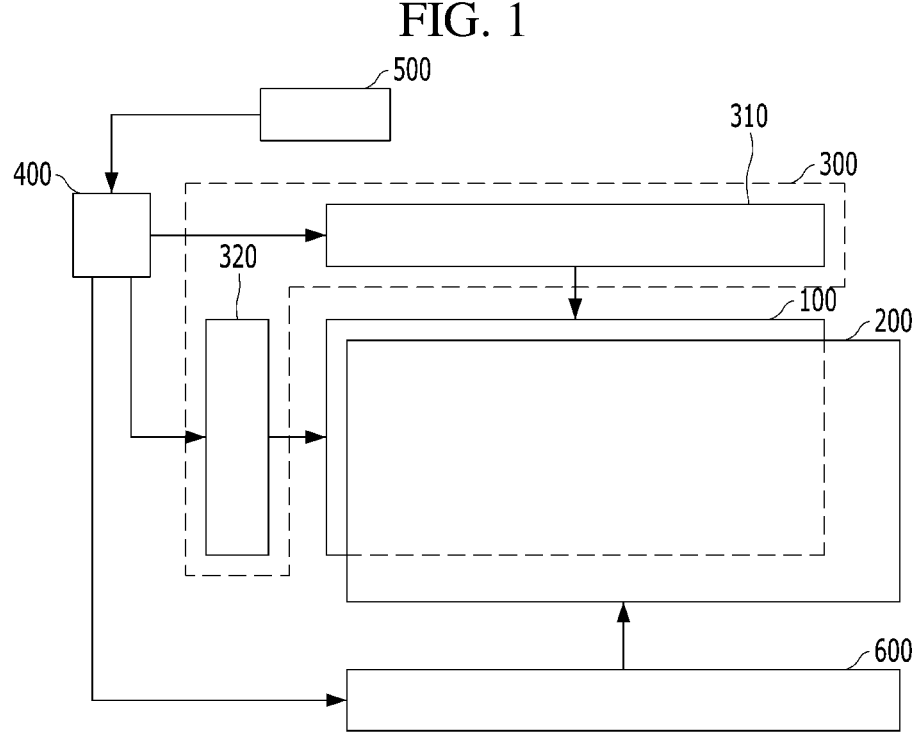
FIG. 1 is a view schematically showing a stereoscopic display apparatus according to an embodiment of the present disclosure.

Hereinafter, details related to the above objects, technical configurations, and operational effects of the embodiments of the present invention will be clearly understood by the following detailed description with reference to the drawings, which illustrate some embodiments of the present invention. Here, the embodiments of the present invention are provided in order to allow the technical sprit of the present invention to be satisfactorily transferred to those skilled in the art, and thus the present invention may be embodied in other forms and is not limited to the embodiments described below.

In addition, the same or extremely similar elements may be designated by the same reference numerals throughout the specification, and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrary named according to the convenience of those skilled in the art without departing the technical sprit of the present invention.

The terms used in the specification of the present invention are merely used in order to describe particular embodiments, and are not intended to limit the scope of the present invention. For example, an element described in the singular form is intended to include a plurality of elements unless the context clearly indicates otherwise. In addition, in the specification of the present invention, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Embodiment

Figure 2:
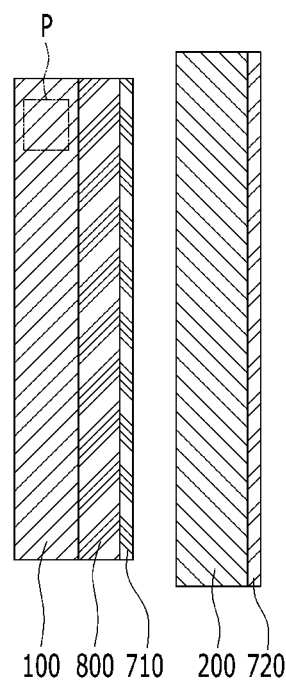
FIGS. 2 and 3 are views showing a display panel and a barrier panel of the stereoscopic display apparatus according to the embodiment of the present disclosure.
Figure 3:
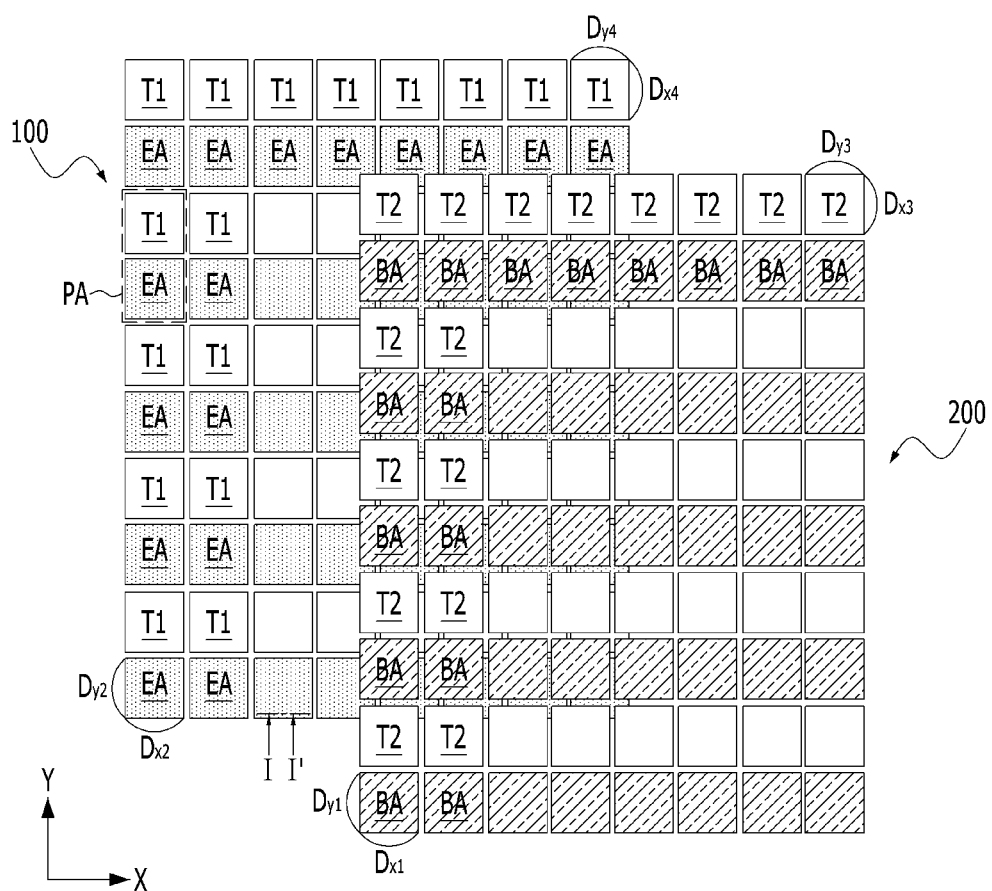
Figure 4:
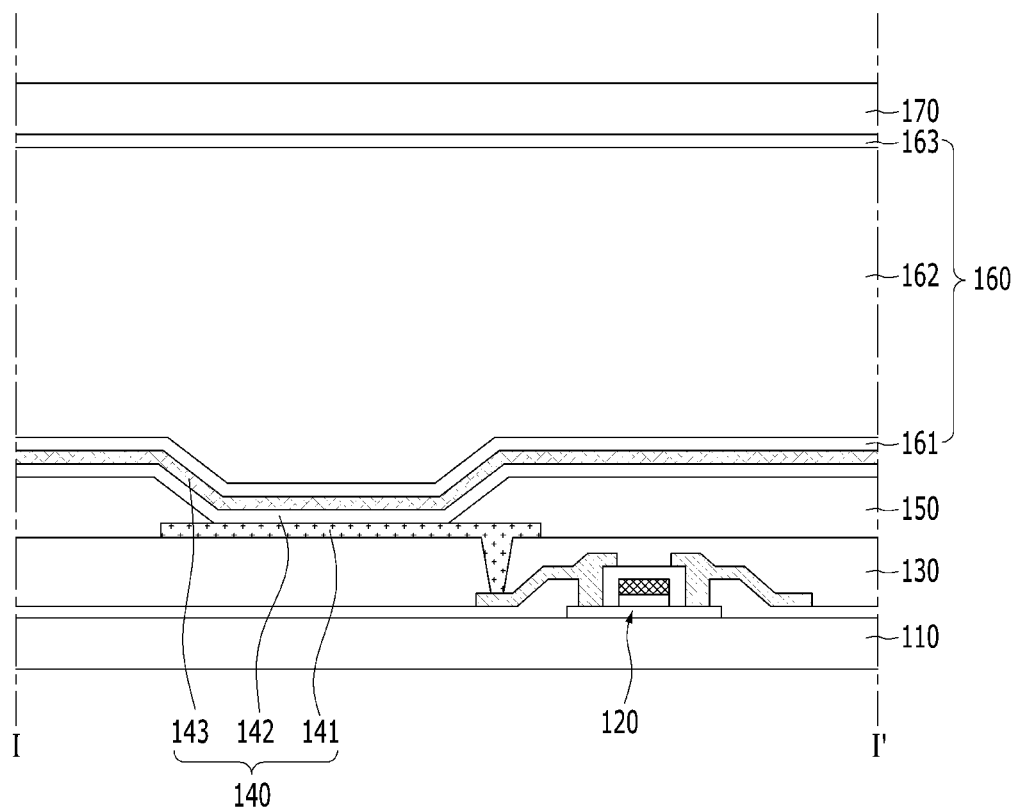
FIG. 4 is a view taken along I-I' of FIG. 3 according to an embodiment of the present disclosure.

FIG. 1 is a view schematically showing a stereoscopic display apparatus according to an embodiment of the present disclosure. FIGS. 2 and 3 are views showing a display panel and a barrier panel of the stereoscopic display apparatus according to the embodiment of the present invention. FIG. 4 is a view taken along I-I' of FIG. 3.

Referring to FIGS. 1 to 4, the stereoscopic display apparatus according to the embodiment of the present disclosure may include a display panel 100, a barrier panel 200, a display driver 300, and a barrier driver 600.

The display panel 100 may generate an image provided to a user. For example, the display panel 100 may include unit pixels PA. Each of the unit pixels PA may realize a specific color. When the image is not realized, the display panel 100 may function as transparent glass. For example, each unit pixel PA of the display panel 100 may include an emission region EA and a first transparent region T1. The emission region EA and the first transparent region T1 of each unit pixel PA may be disposed side by side. For example, the display panel 100 may include the unit pixels PA having the emission region EA and the first transparent region T1, which are disposed side by side in a first direction Y.

The emission region EA of each unit pixel PA may emit light. For example, a light-emitting device 140 may be disposed in the emission region EA of each unit pixel PA. The light-emitting device 140 may be disposed between a lower display substrate 110 and an upper display substrate 170. For example, the display panel 100 may include the light-emitting devices 140 overlapping with the emission region EA of each unit pixel PA between the lower display substrate 110 and the upper display substrate 170.

The light-emitting device 140 may include a lower emission electrode 141, a light-emitting layer 142 and an upper emission electrode 143, which are sequentially stacked on a surface of the lower display substrate 110 toward the upper display substrate 170. The light-emitting layer 142 may generate light having the luminance corresponding to the voltage difference between the lower emission electrode 141 and the upper emission electrode 143. The light-emitting layer 142 may include an organic emission material or an inorganic emission material. For example, the display panel 100 of the stereoscopic display apparatus according to the embodiment of the present disclosure may be an OLED panel including the light-emitting layer 142 composed of an organic material.

A thin film transistor 120 and an over-coat layer 130 may be disposed between the lower display substrate 110 and the light-emitting device 140. The thin film transistor 120 may provide a driving current corresponding to a data signal to the light-emitting device 140 according to a gate signal. The over-coat layer 130 may remove the thickness difference due to the thin film transistor 120. For example, the thin film transistor 120 may be completely covered by the over-coat layer 130. The light-emitting device 140 may be disposed on the over-coat layer 130. For example, the over-coat layer 130 may include a contact hole exposing a portion of the thin film transistor 120.

Each of the light-emitting devices 140 may be independently driven. For example, the lower emission electrode 141 of each light-emitting device 140 may be insulated from the lower emission electrode 141 of adjacent light-emitting device 140 by a bank insulating layer 150. The bank insulating layer 150 may cover an edge of each lower emission electrode 141. The light-emitting layer 142 and the upper emission electrode 143 of each light-emitting device 140 may be stacked on the portion of the corresponding lower emission electrode 141 exposed by the bank insulating layer 150. The light-emitting layer 142 and the upper emission electrode 143 may extend onto the bank insulating layer 150.

An encapsulating element 160 may be disposed on the light-emitting devices 140. The encapsulating element 160 may reduce the damage of the light-emitting devices 140 due to external moisture and impact. The encapsulating element 160 may have a multi-layer structure. For example, the encapsulating element 160 may include a first encapsulating layer 161, a second encapsulating layer 162, and a third encapsulating layer 163, which are sequentially stacked on the light-emitting devices 140.

The first encapsulating layer 161, the second encapsulating layer 162, and the third encapsulating layer 163 may include an insulating material. The second encapsulating layer 162 may include a material different from the first encapsulating layer 161 and the third encapsulating layer 163. For example, the first encapsulating layer 161 and the third encapsulating layer 163 may be an inorganic insulating layer formed of an inorganic material, and the second encapsulating layer 162 may be an organic insulating layer formed of an organic material.

The display panel 100 may be driven by the display driver 300. The display driver 300 may provide various signals for realizing the image to the display panel 100. For example, the display driver 300 may include a data driver 310 and a scan driver 320.

The data driver 310 may apply a data signal to the display panel 100. The scan driver 320 may sequentially apply a scan signal to the display panel 100. The data signal applied by the data driver 310 may be synchronized with the scan signal applied by the scan driver 320.

The display driver 300 may receive a signal from a timing controller 400. For example, the timing controller 400 may provide digital video data and a source timing control signal to the data driver 310, and may provide clock signals, reset clock signals, and start signals to the scan driver 320.

The timing controller 400 may be electrically connected to a location detecting unit 500. The location detecting unit 500 may detect a location of the user. The location detecting unit 500 may provide information of the location of the user. For example, the location detecting unit 500 may include a camera. The signal applied to the display driver 300 from the timing controller 400 may be changed by the location of the user detected by the location detecting unit 500.

The barrier panel 200 may be disposed on the display panel 100. The barrier panel 200 may provide different image to the left eye and the right eye of the user. For example, the stereoscopic display apparatus according to the embodiment of the present disclosure may provide a stereoscopic image to the user. The barrier panel 200 may be driven by the barrier driver 600. The barrier driver 600 may receive a signal from the timing controller 400. For example, the barrier driver 600 may change the signal applying to the barrier panel 200 according to the location of the user.

The barrier panel 200 may include barrier regions BA and second transparent regions T2. Transmission regions and blocking regions to separate image realized by the display panel 100 may be formed in the barrier regions BA according to the signal of the barrier driver 600. For example, the barrier regions BA may overlap the emission region EA of each unit pixel PA. A horizontal distance Dy1 of each barrier region BA in the first direction Y may be the same as a horizontal distance Dy2 of the emission region EA of each unit pixel PA in the first direction Y. A horizontal distance Dx1 of each barrier region BA in a second direction X perpendicular to the first direction Y may be the same as a horizontal distance Dx2 of the emission region EA of each unit pixel PA in the second direction X. Thus, in the stereoscopic display apparatus according to the embodiment of the present invention, the quality of the stereoscopic image provided to the user through the barrier panel 200 may be maintained.

The second transparent regions T2 may overlap the first transparent region T1 of each unit pixel PA. A horizontal distance Dy3 of each second transparent region T2 in the first direction Y may be the same as a horizontal distance Dy4 of the first transparent region T1 of each unit pixel PA in the first direction Y. A horizontal distance Dx3 of each second transparent region T2 in the second direction X may be the same as a horizontal distance Dx4 of the first transparent region T1 of each unit pixel PA in the second direction X. Thus, in the stereoscopic display apparatus according to the embodiment of the present invention, the transparency of the transparent region may be increased.

Figure 5:
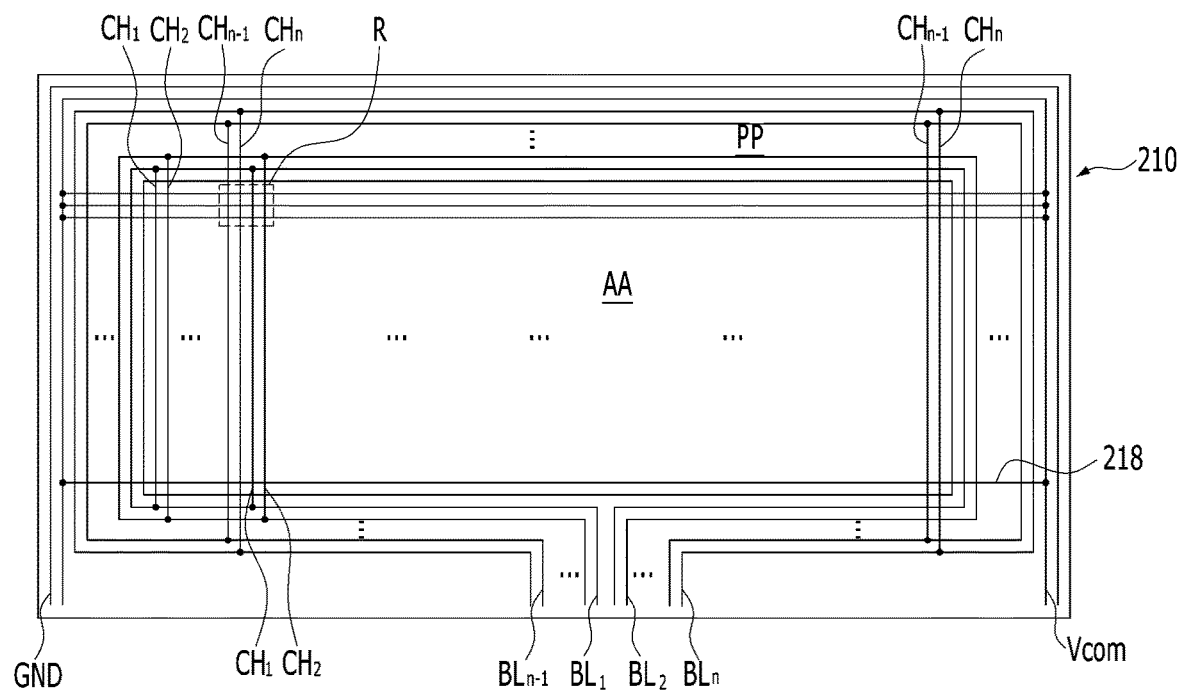
FIG. 5 is a view showing signal lines on a lower barrier substrate of the barrier panel in the stereoscopic display apparatus according to the embodiment of the present disclosure.
Figure 5:
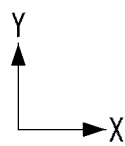
Figure 6:
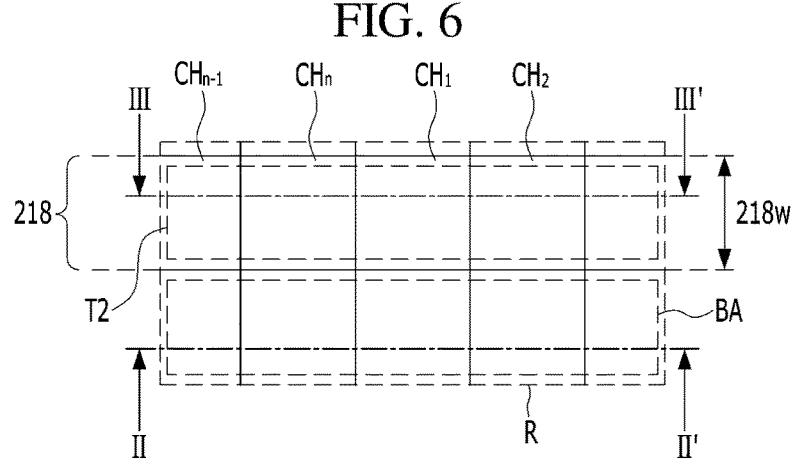
FIG. 6 is an enlarged view of R region in FIG. 5 according to an embodiment of the present disclosure.
Figure 7:
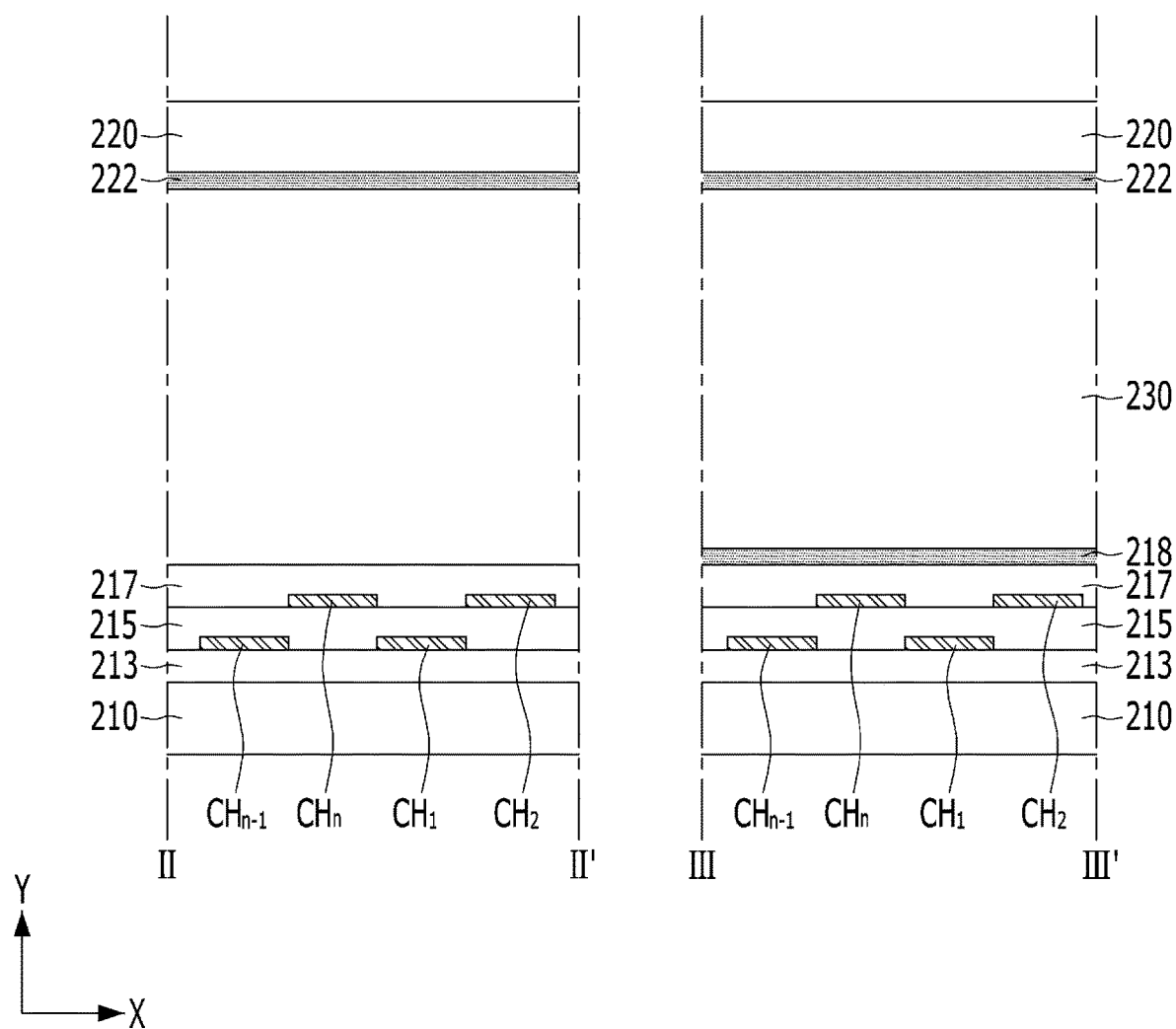
FIG. 7 is a view taken along II-II' and III-III' of FIG. 5 according to an embodiment of the present disclosure.

FIG. 5 is a view showing signal lines on a lower barrier substrate of the barrier panel in the stereoscopic display apparatus according to the embodiment of the present disclosure. FIG. 6 is an enlarged view of R region in FIG. 5. FIG. 7 is a view taken along II-II' and III-III' of FIG. 5.

Referring FIGS. 3 and 5 to 7, the barrier panel 200 of the stereoscopic display apparatus according to the embodiment of the present disclosure may include channel electrodes CH1-CHn, a lower insulating layer 217, lower common electrodes 218, a barrier liquid crystal layer 230, and an upper common electrode layer 222, which are sequentially stacked between a lower barrier substrate 210 and an upper barrier substrate 220.

The lower barrier substrate 210 may be disposed close to the display panel 100. The lower barrier substrate 210 may include an insulating material. The lower barrier substrate 210 may include a transparent material. For example, the lower barrier substrate 210 may include glass or plastic.

The lower barrier substrate 210 may include an active area AA and a peripheral area PP. The light emitted from each unit pixel PA of the display panel 100 may pass through the active area AA of the lower barrier substrate 210. For example, the active area AA of the lower barrier substrate 210 may overlap the unit pixels PA of the display panel 100. The peripheral area PP of the lower barrier substrate 210 may be disposed outside the active area AA of the lower barrier substrate 210. For example, the active area AA of the lower barrier substrate 210 may be surrounded by the peripheral area PP of the lower barrier substrate 210.

The upper barrier substrate 220 may be disposed on the lower barrier substrate 210. For example, the lower barrier substrate 210 may be disposed between the upper display substrate 170 of the display panel 100 and the upper barrier substrate 220. The upper barrier substrate 220 may be parallel with the lower barrier substrate 210.

The upper barrier substrate 220 may include an insulating material. The upper barrier substrate 220 may include a transparent material. For example, the upper barrier substrate 220 may include glass or plastic. The upper substrate 220 may include a material same as the lower barrier substrate 210.

The upper barrier substrate 220 may overlap the active area AA and the peripheral area PP of the lower barrier substrate 210. For example, the upper barrier substrate 220 may include an active area having the same size as the active area AA of the lower barrier substrate 210.

The barrier liquid crystal layer 230 may overlap the active area AA of the lower barrier substrate 210. For example, the barrier liquid crystal layer 230 may be disposed between the active area AA of the lower barrier substrate 210 and the upper barrier substrate 220. The barrier liquid crystal layer 230 may include a liquid crystal. For example, the liquid crystal of the barrier liquid crystal layer 230 may be TN mode or ECB mode.

The channel electrode CH1-CHn may form the transmission regions and the blocking regions according to the signal of the barrier driver 600. For example, the channel electrodes CH1-CHn may extend in parallel in the first direction Y. The channel electrodes CH1-CHn may cross the active area AA of the lower barrier substrate 210 in the first direction Y. The transmission regions and the blocking regions due to the channel electrodes CH1-CHn may be formed in the active area AA.

The channel electrodes CH1-CHn may include a conductive material. The channel electrodes CH1-CHn may include a transparent material. For example, the channel electrode CH1-CHn may be a transparent electrode formed of a transparent conductive material, such as ITO and IZO.

The channel electrodes CH1-CHn may have a multi-layer structure. For example, the channel electrodes CH1-CHn may include lower channel electrodes CH1 and CHn−1, and upper channel electrodes CH2 and CHn, which are insulated by a channel insulating layer 215. The channel insulating layer 215 may include an insulating material. For example, the channel insulating layer 215 may include silicon oxide or silicon nitride.

The channel electrodes CH1-CHn may be electrically connected to the barrier driver 600 by link lines BL1-BLn. The link lines BL1-BLn may be disposed on the peripheral area PP of the lower barrier substrate 210. The link lines BL1-BLn may extend along an edge of the active area AA of the lower barrier substrate 210. An upper end and a lower end of each channel electrode CH1-CHn may be connected to the same link line BL1-BLn. For example, each of the channel electrodes CH1-CHn may form a closed loop with the corresponding link line BL1-BLn. The channel electrodes CH1-CHn may form a group every n. For example, each of the channel electrodes CH1-CHn may be connected to the link line BL1-BLn same as the n+1th channel electrode CH1-CHn from the corresponding channel electrode CH1-CHn. Thus, in the stereoscopic display apparatus according to the embodiment of the present invention, the peripheral area PP of the lower barrier substrate 210 may be minimized.

The link lines BL1-BLn may include a conductive material. The link lines BL1-BLn may have the conductivity higher than the channel electrodes CH1-CHn. For example, the link lines BL1-BLn may include a metal. The peripheral area PP of the lower barrier substrate 210 may be a blocking region.

A barrier buffer layer 213 may be disposed between the lower barrier substrate 210 and the channel electrodes CH1-CHn. The barrier buffer layer 213 may reduce pollution due to the lower barrier substrate 210 in a process of forming the channel electrodes CH1-CHn. The barrier buffer layer 213 may include an insulating material. For example, the barrier buffer layer 213 may include silicon oxide.

The link lines BL1-BLn may be disposed closer to the lower barrier substrate 210 than the channel electrodes CH1-CHn. For example, the link lines BL1-BLn may be disposed between the lower barrier substrate 210 and the barrier buffer layer 213. Contact holes for connecting each channel electrode CH1-CHn to the corresponding link line BL1-BLn may be disposed in a portion of the barrier buffer layer 213 which is disposed on the peripheral area PP of the lower barrier substrate 210.

A common voltage supply line Vcom and a ground line GND may be disposed on the peripheral area PP of the lower barrier substrate 210. The common voltage supply line Vcom may supply a common voltage. The common voltage supply line Vcom may be disposed outside the link lines BL1-BLn. The ground line GND may be disposed outside the common voltage supply line Vcom. For example, the common voltage supply line Vcom and the ground line GND may extend along an edge of the lower barrier substrate 210.

The common voltage supply line Vcom and the ground line GND may include a conductive material. The common voltage supply line Vcom and the ground line GND may have conductivity higher than the channel electrode CH1-CHn. The ground line GND may include the same material as the common voltage supply line Vcom. The common voltage supply line Vcom and the ground line GND may include a material same as the link lines BL1-BLn. For example, the common voltage supply line Vcom and the ground line GND may be disposed between the lower barrier substrate 210 and the barrier buffer layer 213.

The upper common electrode layer 222 may be disposed on a surface of the upper barrier substrate 220 toward the lower barrier substrate 210. The upper common electrode layer 222 may include a region overlapping with the active area AA of the lower barrier substrate 210. For example, the upper common electrode layer 222 may extend on the peripheral area PP of the lower barrier substrate 210. A size of the upper common electrode layer 222 may be larger than a size of the active area AA of the lower barrier substrate 210.

The upper common electrode layer 222 may include a conductive material. The upper common electrode layer 222 may include a transparent material. For example, the upper common electrode layer 222 may be a transparent electrode formed of a transparent conductive material, such as ITO and IZO. The upper common electrode layer 222 may include a material same as the channel electrodes CH1-CHn.

The upper common electrode layer 222 may be electrically connected to the common voltage supply line Vcom. For example, at least one conductive element for connecting the upper common electrode layer 222 to the common voltage supply line Vcom may be disposed on the peripheral area PP of the lower barrier substrate 210. The conductive element may include a metal, such as silver (Ag). Thus, in the barrier panel 200 of the stereoscopic display apparatus according to the embodiment of the present invention, vertical electric fields may be formed by the channel electrodes CH1-CHn and the upper common electrode layer 222. A portion of barrier liquid crystal layer 230 overlapping with each channel electrode CH1-CHn may have the transparency according to the vertical electric fields which is formed between the corresponding channel electrode CH1-CHn and the upper common electrode layer 222. The vertical electric fields formed between each channel electrode CH1-CHn and the upper common electrode layer 222 may be controlled by the voltage applied to each channel electrode CH1-CHn. Therefore, in the barrier panel 200 of the stereoscopic display apparatus according to the embodiment of the present invention, the blocking regions and the transmission regions may be formed in the active area AA by controlling the voltage which is applied to the channel electrodes CH1-CHn.

The lower common electors 218 may extend in a second direction X perpendicular to the first direction Y. The lower common electrodes 218 may cross the active area AA of the lower barrier substrate 210 in the second direction X. For example, each of the lower common electrodes 218 may cross with the channel electrodes CH1-CHn in the active area AA. Each of the channel electrodes CH1-CHn may cross with the lower common electrodes 218.

The lower common electrodes 218 may include a conductive material. The lower common electrodes 218 may include a transparent material. For example, the lower common electrodes 218 may be a transparent electrode formed of a transparent conductive material, such as ITO and IZO. The lower common electrodes 218 may include a material same as the channel electrodes CH1-CHn.

The lower common electrodes 218 may be insulated from the channel electrodes CH1-CHn by the lower insulating layer 217. For example, the lower insulating layer 217 may be disposed between the channel electrodes CH1-CHn and the lower common electrodes 218. The upper channel electrodes CH2 and CHn may be covered by the lower insulating layer 217. The lower insulating layer 217 may include an insulating material. For example, the lower insulating layer 217 may include silicon oxide or silicon nitride. The lower insulating layer 217 may include the same material as the channel insulating layer 215.

The lower common electrodes 218 may be connected to the common voltage supply line Vcom. For example, the channel insulating layer 215 and the lower insulating layer 217 may include contact holes between each lower common electrode 218 and the common voltage supply line Vcom in the peripheral area PP of the lower barrier substrate 210. Thus, in the stereoscopic display apparatus according to the embodiment of the present disclosure, the vertical electric fields may be formed between the lower common electrodes 218 and the upper common electrode layer 222. That is, in the stereoscopic display apparatus according to the embodiment of the present disclosure, a portion of the barrier liquid crystal layer 230 overlapping with the lower common electrodes 218 may be not controlled by the channel electrodes CH1-CHn. For example, in the barrier panel 200 of the stereoscopic display apparatus according to the embodiment of the present disclosure, the active area AA overlapping with the lower common electrodes 218 may have a uniform transparency.

The lower common electrodes 218 may overlap the second transparent regions T2 of the barrier panel 200. For example, a horizontal distance 218w of each lower common electrode 218 in the first direction Y may be the same as a horizontal distance Dy3 of each second transparent region T2 in the first direction Y. The channel electrodes CH1-CHn and the lower common electrodes 218 may be stacked on the second transparent regions T2 of the barrier panel 200. The barrier regions BA of the barrier panel 200 may be disposed between the lower common electrodes 218. For example, a spaced distance between the lower common electrodes 218 in the first direction Y may be the same as the horizontal distance Dy1 of each barrier region BA in the first direction Y. Only the channel electrodes CH1-CHn may be disposed in the barrier regions BA of the barrier panel 200.

The barrier liquid crystal layer 230 may have normally white mode. Thus, in the stereoscopic display apparatus according to the embodiment of the present disclosure, the blocking region due to the channel electrodes CH1-CHn may be not formed in the second transparent regions T2. In the stereoscopic display apparatus according to the embodiment of the present disclosure, the light passing through the first transparent regions T1 of the display panel 100 may pass through the second transparent region T2 of the barrier panel 200. Therefore, in the stereoscopic display apparatus according to the embodiment of the present disclosure, the luminance deterioration of the transparent region due to the barrier panel 200 may be prevented.

Also, in the barrier panel 200 of the stereoscopic display apparatus according to the embodiment of the present disclosure, the channel electrodes CH1-CHn may cross the barrier regions BA and the second transparent regions T2, which are disposed in the first direction Y. For example, in the barrier panel 200 of the stereoscopic display apparatus according to the embodiment of the present disclosure, the second transparent regions T2 may overlap the intersections of the channel electrodes CH1-CHn and the lower common electrodes 218. Thus, in the barrier panel 200 of the stereoscopic display apparatus according to the embodiment of the present disclosure, the formation of the blocking region in the second transparent regions T2 due to the channel electrodes CH1-CHn may be reduced without changing the location and the shape of the channel electrodes CH1-CHn. That is, in the barrier panel 200 of the stereoscopic display apparatus according to the embodiment of the present disclosure, the shape of the channel electrodes CH1-CHn may be simplified. Therefore, in the barrier panel 200 of the stereoscopic display apparatus according to the embodiment of the present invention, the efficiency of the forming process may be improved.

Accordingly, in the stereoscopic display apparatus according to the embodiment of the present disclosure, each unit pixel PA of the display panel 100 may include the emission region EA and the first transparent region T1, the barrier panel 200 may include the barrier regions BA overlapping with the emission region EA of each unit pixel PA and the second transparent regions T2 overlapping with the first transparent region T1 of each unit pixel PA, and the second transparent regions T2 of the barrier panel 200 may overlap the lower common electrodes 218 applied the voltage same as the upper common electrode layer 222 between the channel electrodes CH1-CHn and the barrier liquid crystal layer 230. Thus, in the stereoscopic display apparatus according to the embodiment of the present disclosure, the formation of the blocking region in the second transparent regions T2 of the barrier panel 200 due to the channel electrodes CH1-CHn may be reduced without changing the location and/or the shape of the channel electrodes CH1-CHn. Therefore, in the stereoscopic display apparatus according to the embodiment of the present disclosure, the process efficiency and the transparency may be increased without the quality deterioration of the stereoscopic image.

The stereoscopic display apparatus according to the embodiment of the present disclosure may further include a first linear polarizer 710, a second linear polarizer 720, and a quarter wave plate 800. The barrier panel 200 may be disposed between the first linear polarizer 710 and the second linear polarizer 720. The quarter wave plate 800 may be disposed between the display panel 100 and the first linear polarizer 710. For example, the quarter wave plate 800 and the first linear polarizer 710 may be sequentially stacked on the display panel 100. Thus, in the stereoscopic display apparatus according to the embodiment of the present disclosure, the reflection of the external light may be prevented. Therefore, in the stereoscopic display apparatus according to the embodiment of the present invention, the quality of the stereoscopic image provided to the user may be improved.

Figure 8:
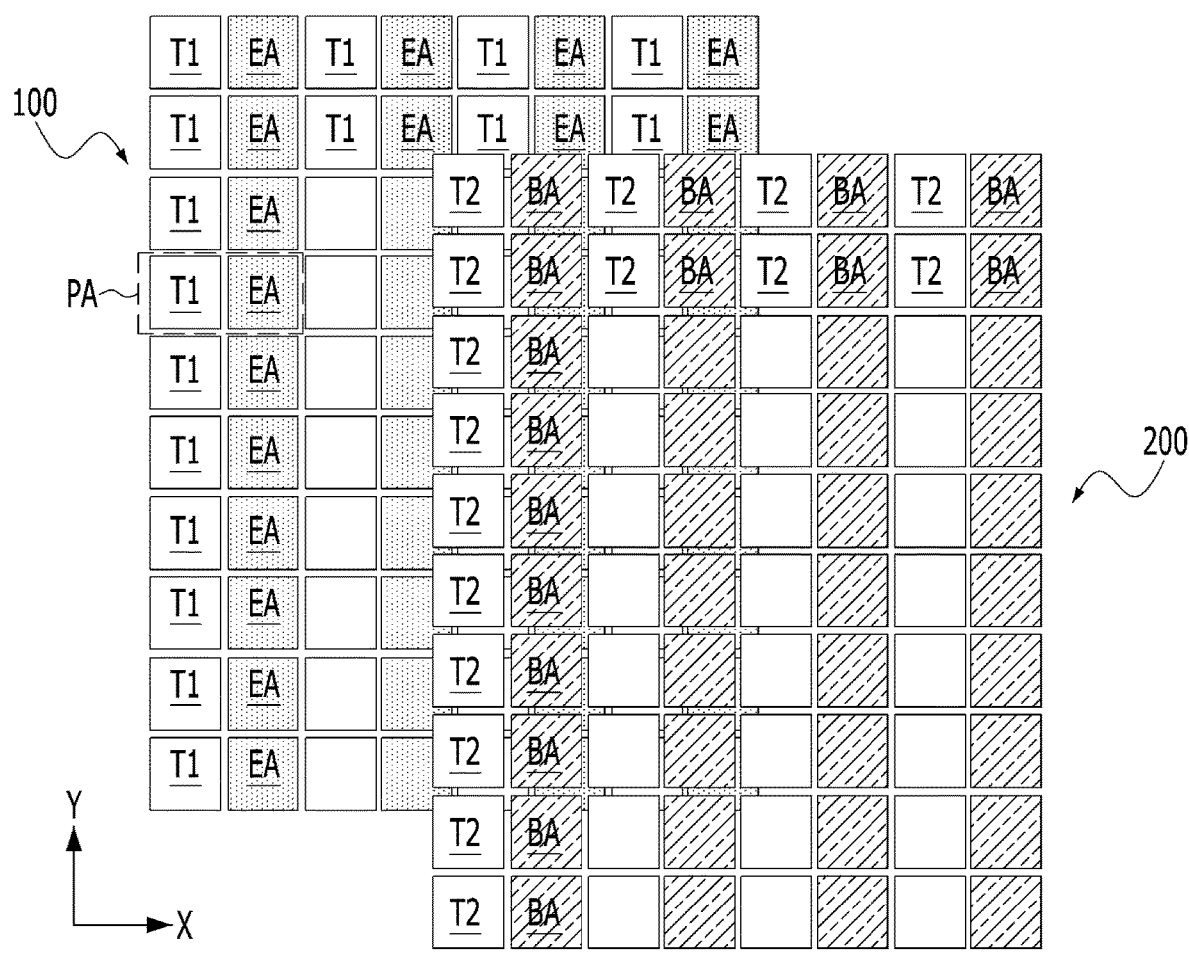
FIGS. 8 to 10 are views respectively showing the stereoscopic display apparatus according to another embodiment of the present disclosure.

The stereoscopic display apparatus according to the embodiment of the present disclosure is described that each unit pixel PA of the display panel 100 may include the emission region EA and the first transparent region T1, which are disposed side by side in the first direction Y. However, in the stereoscopic display apparatus according to another embodiment of the present disclosure, each unit pixel PA of the display panel 100 may include the emission region EA and the first transparent region T1, which are disposed side by side in the second direction X perpendicular to the first direction Y, as shown in FIG. 8. In the stereoscopic display apparatus according to another embodiment of the present disclosure, the barrier regions BA and the second transparent regions T2 of the barrier panel 200 may be disposed side by side in the second direction X. That is, in the stereoscopic display apparatus according to another embodiment of the present disclosure, the barrier panel 200 may include the barrier regions BA and the second transparent regions T2, which are repeatedly disposed in the second direction X. Thus, in the stereoscopic display apparatus according to another embodiment of the present disclosure, the lower common electrodes 218 may extend in the first direction Y. For example, in the stereoscopic display apparatus according to another embodiment of the present disclosure, the lower common electrodes 218 may overlap some of the channel electrodes CH1-CHn. Therefore, in the stereoscopic display apparatus according to another embodiment of the present disclosure, the process efficiency and the transparency may be increased without the relatively location of the emission region EA and the first transparent region T1 in each unit pixel PA of display panel 100.

Figure 9:
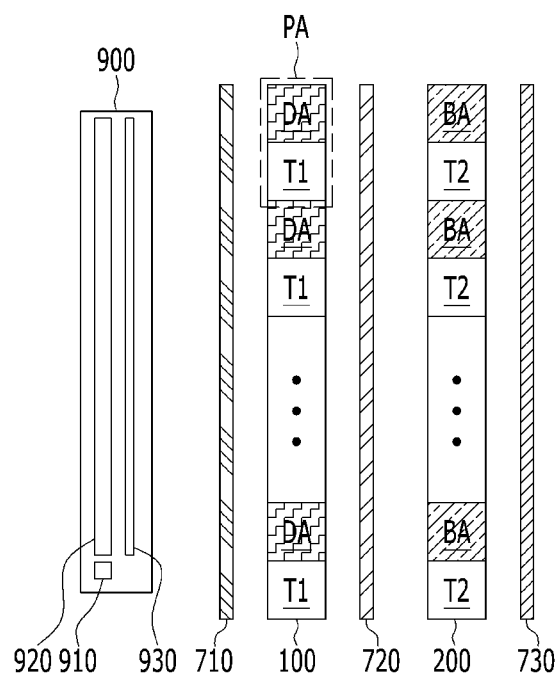

The stereoscopic display apparatus according to the embodiment of the present disclosure is described that the light-emitting device 140 is disposed in the emission region EA of each unit pixel PA. However, in the stereoscopic display apparatus according to another embodiment of the present disclosure, each unit pixel PA of the display panel 100 may include a display region DA realizing the image using the light provided from the outside of the display panel 100, and the first transparent region T1 through where the light passes. For example, the stereoscopic display apparatus according to another embodiment of the present disclosure may include a back-light unit 900 providing the light to the display panel 100, as shown in FIG. 9. The display panel 100 may be disposed between the back-light unit 900 and the barrier panel 200. For example, the display panel 100 of the stereoscopic display apparatus according to another embodiment of the present disclosure may be a liquid crystal panel. The display panel 100 may be disposed between the first linear polarizer 710 and the second linear polarizer 720. A third linear polarizer 730 may be disposed on an outer surface of the barrier panel 200.

The back-light unit 900 may have a structure through which the external light passes. The back-light unit 900 may be an edge type. For example, the back-light unit 900 may include a light source 910 on a side surface of a light guide 920, and an optical element 930 on a surface of the light guide 920 toward the display panel 100.

The barrier regions BA of the barrier panel 200 may overlap the display region DA of each unit pixel PA. The second transparent regions T2 of the barrier panel 200 may overlap the first transparent region T1 of each unit pixel PA. The barrier panel 200 may include the lower common electrodes 218 overlapping with the first transparent regions T1 of the display panel 100. Thus, in the stereoscopic display apparatus according to another embodiment of the present invention, the quality of the stereoscopic image provided to the user may be maintained, and the transparency may be increased, regardless of the type of display panel 100.

Figure 10:
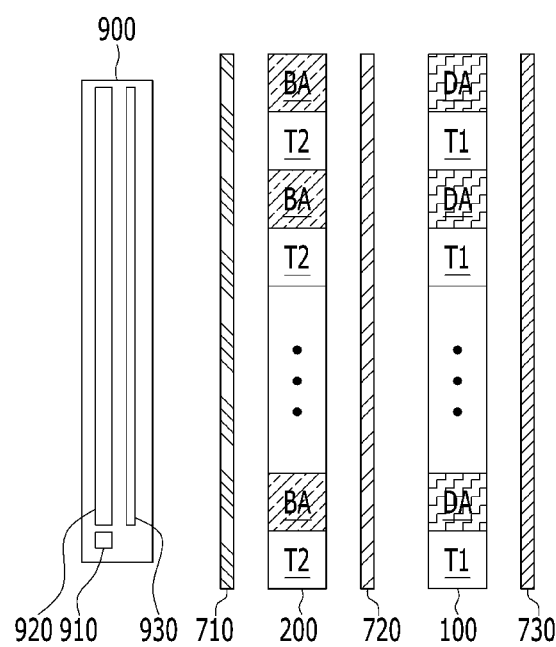

The stereoscopic display apparatus according to another embodiment of the present disclosure may include the barrier panel 200 between the back-light unit 900 and the display panel 100, as shown in FIG. 10. The first linear polarizer 710 may be disposed between the back-light unit 900 and the barrier panel 200. The second linear polarizer 720 may be disposed between the barrier panel 200 and the display panel 100. The third linear polarizer 730 may be attached on the external surface of the display panel 100. Thus, in the stereoscopic display apparatus according to another embodiment of the present disclosure, the transparency may be increased, regardless of the relatively location of the display panel 100 and the barrier panel 200.

In the result, the stereoscopic display apparatus according to the embodiments of the present invention may comprise the barrier panel having the second transparent regions, wherein the second transparent regions overlapping with the first transparent regions of the display panel. Thus, in the stereoscopic display apparatus according to the embodiments of the present invention, the light passing through the first transparent regions of the display panel may be not blocked by the barrier panel. Therefore, in the stereoscopic display apparatus according to the embodiments of the present invention, transparency may be increased.

What is claimed is:

1. A stereoscopic display apparatus comprising:
   a display panel comprising a plurality of unit pixels, each of the plurality of unit pixels of the display panel including an image displaying region and a first transparent region; and
   a barrier panel on the display panel, the barrier panel including channel electrodes, a lower insulating layer, lower common electrodes, a barrier liquid crystal layer, and an upper common electrode layer, which are sequentially stacked between a lower barrier substrate and an upper barrier substrate,
   wherein the barrier panel includes barrier regions overlapping with the image displaying region of each of the plurality of unit pixels, and second transparent regions overlapping with the first transparent region of each of the plurality of unit pixels, and
   wherein the lower common electrodes overlap with the second transparent regions.

2. The stereoscopic display apparatus according to claim 1, wherein each of the second transparent regions has a same size as the first transparent region of each of the plurality of unit pixels, and each of the barrier regions has a same size as the image displaying region of each of the plurality of unit pixels.

3. The stereoscopic display apparatus according to claim 1, wherein the barrier panel includes further includes a barrier buffer layer disposed between the lower barrier substrate and the channel electrodes.

4. The stereoscopic display apparatus according to claim 3, wherein the channel electrodes are electrically connected to a barrier driver by link lines.

5. The stereoscopic display apparatus according to claim 4, wherein contact holes for connecting each of the channel electrodes to a corresponding link line is disposed in a portion of the barrier buffer layer which is disposed on a peripheral area of the lower barrier substrate.

6. The stereoscopic display apparatus according to claim 1, wherein the channel electrodes include lower channel electrodes and upper channel electrodes, which are insulated by a channel insulating layer.

7. The stereoscopic display apparatus according to claim 1, wherein the upper common electrode layer overlaps with the barrier regions and the second transparent regions.

8. The stereoscopic display apparatus according to claim 1, wherein the image displaying region and the first transparent region of each of the plurality of unit pixels are disposed side by side in a first direction, and
   wherein each of the channel electrodes crosses the barrier regions and the second transparent regions, which are disposed side by side in the first direction.

9. The stereoscopic display apparatus according to claim 8, wherein each of the lower common electrodes extends in a second direction perpendicular to the first direction, and
wherein the second transparent regions overlap with intersections of the lower common electrodes and the channel electrodes.

10. The stereoscopic display apparatus according to claim 9, wherein a horizontal distance of each lower common electrode in the first direction is a same as a horizontal distance of each second transparent region in the first direction.

11. The stereoscopic display apparatus according to claim 9, wherein the barrier panel further includes a common voltage supply line extending along an edge of the lower barrier substrate, and
wherein each of the lower common electrodes is connected to the common voltage supply line outside of an active area in which the barrier regions and the second transparent regions are disposed.

12. The stereoscopic display apparatus according to claim 1, wherein the display panel includes light-emitting structures in the image displaying region of each unit pixel.

13. The stereoscopic display apparatus according to claim 1, further comprising:
a first linear polarizer;
a second linear polarizer; and
a quarter wave plate,
wherein the barrier panel is disposed between the first linear polarizer and the second linear polarizer, and the quarter wave plate is disposed between the display panel and the first linear polarizer.

14. The stereoscopic display apparatus according to claim 1, further comprising:
a back-light unit configured to provide light to the display panel;
a first linear polarizer;
a second linear polarizer; and
a third linear polarizer,
wherein the display panel is disposed between the back-light unit and the barrier panel, the display panel is disposed between the first linear polarizer and the second linear polarizer, and the barrier panel is disposed between the second linear polarizer and the third linear polarizer.

15. The stereoscopic display apparatus according to claim 1, further comprising:
a back-light unit configured to provide light to the display panel;
a first linear polarizer;
a second linear polarizer; and
a third linear polarizer,
wherein the barrier panel is disposed between the back-light unit and the display panel, the barrier panel is disposed between the first linear polarizer and the second linear polarizer, and the display panel is disposed between the second linear polarizer and the third linear polarizer.

* * * * *